United States Patent [19]
Stein

[11] Patent Number: 6,126,991
[45] Date of Patent: Oct. 3, 2000

[54] METHOD FOR ENHANCING THE PROPERTIES OF BIOFOULING RELEASE COATINGS

[75] Inventor: Judith Stein, Schenectady, N.Y.

[73] Assignee: General Electric Company, Schenectady, N.Y.

[21] Appl. No.: 09/294,069

[22] Filed: Apr. 19, 1999

[51] Int. Cl.$^7$ ................ B32B 35/06; B05D 1/38
[52] U.S. Cl. ............ 427/140; 427/142; 427/407.1; 427/258; 427/334; 427/416
[58] Field of Search ...................... 427/140, 142, 427/2.24, 2.28, 2.3, 2.31, 258, 333, 334, 340, 407.1, 202, 205; 106/287.12, 287.16; 252/384; 556/450, 463

[56] References Cited

U.S. PATENT DOCUMENTS 5,593,732  1/1997  Griffith ..................... 427/407.1

*Primary Examiner*—Shrive Beck
*Assistant Examiner*—Jennifer Kolb
*Attorney, Agent, or Firm*—Noreen C. Johnson; Douglas E. Stoner

[57] ABSTRACT

The present invention relates to a method of introducing enhanced biofouling release properties to intact biofouling release coatings by exposing the surface of the biofouling release coating to a restorative compound for a time sufficient to effect enhancement of biofouling release properties. Also disclosed are kits useful in carrying out these processes.

11 Claims, No Drawings

METHOD FOR ENHANCING THE PROPERTIES OF BIOFOULING RELEASE COATINGS

BACKGROUND OF THE INVENTION

This invention was made with Government support under Government Contract No. N00014-96-C-0145 awarded by DARPA. The Government may have certain rights to the invention.

This invention is related to the field of biofouling release coatings for use in industrial, commercial or military marine and freshwater applications. In particular, this invention relates to a method for regenerating a biofouling release coating which has decreased release efficacy due to depletion or lack of an incorporated oil.

Damage to underwater power cables, ships, and the like due to colonization of their surfaces by organisms (including, but not limited to, barnacles) has serious economic consequences in marine and freshwater industries. Antifouling and fouling release coatings have been developed to prevent or reduce biofouling, and to loosen the strength of the attachment of marine organisms to make cleaning surfaces easier. There are many commercial foul release coatings including, for example, GE EXSIL® 2200. However there have been no reports of renewal methods for these coatings.

There has been a continuing need in the coatings industry for new methods for increasing the useful life of fouling release and antifouling coatings. At present, the useful lifetime of a copper ablative antifouling coating is approximately three years, after which time the coating must be removed from the hull and reapplied. It is estimated that the effective life span of silicone fouling release coatings is about 5–7 years.

The release characteristics of silicone fouling release coatings are known to be significantly enhanced by the addition of oils such as mineral oil and silicone oils. Barnacle adhesion measurements on fouling release coatings substantiate that removal of fouling requires less work when the silicone topcoat has been prepared with incorporated oils. For example, silicone oils such as dimethyl silicone oils, phenyl-modified silicone oils, and polyether-modified silicone oils have been incorporated into biofouling release coatings.

Unfortunately, these additives tend to diffuse out of the coating during use and are thus rapidly depleted. The depleted coatings lose their enhanced foul-release properties, and consequently their effectiveness is reduced. Depletion of the additive therefore limits the useful life of the coating, necessitating periodic removal and reapplication of a new silicone biofouling release coating. A recoat technology for these coatings which does not require complete removal and reapplication of the coating would significantly reduce life-cycle costs and enhance the attractiveness of these coatings to the power utility, military, industrial, and commercial markets.

To forestall the rapid oil-depletion of oil-containing biofouling release coatings, larger amounts of oil have been incorporated into these coatings. This solution to the problem does curtail the rapid depletion of the oil, but unfortunately it tends to severely impair the mechanical properties of the coatings, particularly tear strength and abrasion resistance. Increasing the original additive content of biofouling release coatings, therefore, does not provide a workable method of increasing the life of the coatings.

Silicone biofouling release coatings made without additives also have been used to make cleaning surfaces of organisms easier, but they are not as effective as coatings with incorporated oils. A method for enhancing the properties of these coatings, as well as restoring the enhanced release properties of older coatings originally containing additives is highly desirable.

SUMMARY OF THE INVENTION

The present invention relates to a method of introducing enhanced biofouling release properties to an intact biofouling release coating, which method comprises exposing the surface of the biofouling release coating to a restorative compound for a time sufficient to effect enhancement of biofouling release properties.

In a further aspect, the present invention relates to a kit for the enhancement of the biofouling release properties of an intact biofouling release coating, said kit comprising a container containing a restorative compound suitable for said enhancement.

In yet another aspect, the present invention relates to a kit for the enhancement of the biofouling release properties of an intact biofouling release coating, said kit comprising a container containing a biofouling release coating, and a container containing a restorative compound suitable for said enhancement.

DETAILED DESCRIPTION OF THE INVENTION

The term "oil-depleted" referring to release coatings will be used in this application to denote any biofouling release coating, whether manufactured with or without incorporated oils, which has been depleted of the oil additive or lacks the oil additive, and therefore has a reduced effectiveness compared to coatings containing the oil additive. It is not to be construed as limited solely to coatings which were manufactured containing oil and have subsequently been depleted of the oil.

The biofouling release coatings which may be enhanced by the present invention include generally any coating into which a restorative compound may be incorporated for enhancement of biofouling release properties. The present invention is particularly applicable to release coatings which include a conventional one-part or two-part RTV composition, preferably a two-part composition. It may comprise at least one reactive silicone, at least one condensation catalyst and at least one crosslinking agent.

The reactive silicone is preferably at least one of a polydialkylsiloxane, a polydiarylsiloxane, or a polyalkylarylsiloxane typically of the formula

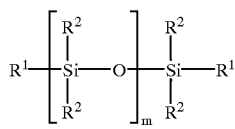

(I)

wherein each $R^1$ is a hydroxyl radical or

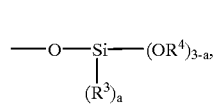

(II)

each $R^2$ is independently a hydrocarbon or fluorinated hydrocarbon radical, each $R^3$ and $R^4$ is independently a hydrocarbon radical, a is 0 or 1, and m has a value such that the viscosity of said compound under ambient temperature and pressure conditions is up to about 50,000 centipoise. Illustrative hydrocarbon radicals are $C_{1-20}$ alkyl, $C_{6-20}$ aryl and alkaryl, vinyl, isopropenyl, allyl, butenyl and hexenyl, with phenyl, $C_{1-4}$ alkyl and especially methyl being preferred. An illustrative fluorinated hydrocarbon radical is 3,3,3-trifluoropropyl. Preferably, each $R^2$, $R^3$ and $R^4$ is alkyl and preferably methyl. The biofouling release coatings may comprise two or more reactive silicones, differing in average molecular weight, which may afford a bimodal composition having performance advantages over a simple monomodal composition.

The condensation catalyst may be any of those known to be useful for promoting condensation curing of an RTV material. Suitable catalysts include tin, zirconium, titanium, and aluminum compounds as illustrated by dibutyltin dilaurate, dibutyltin diacetate, dibutyltin methoxide, dibutyltin bis(acetylacetonate), 1,3-dioxypropanetitanium bis (acetylacetonate), titanium naphthenate, tetrabutyl titanate, zirconium octanoate, and aluminum acetylacetonate. Various salts of organic acids with such metals as lead, iron, cobalt, manganese, zinc, antimony and bismuth may also be employed. For most purposes, the tin and titanium compounds are preferred.

As crosslinking agents, trifunctional (T) and tetrafunctional (Q) silanes are useful, the term "functional" in this context denoting the presence of a silicon-oxygen bond. They include such compounds as methytrimethoxysilane, methyltriethoxysilane, 2-cyanoethyltrimethoxysilane, methyltriacetoxysilane, tetraethyl silicate and tetra-n-propyl silicate. The Q-functional compounds, i.e., tetraalkyl silicates, are often preferred.

The coating may contain other constituents, including reinforcing and extending (non-reinforcing) fillers. Suitable reinforcing fillers are commercially available in the form of relatively large aggregated particles typically having an average size significantly greater than about 300 nanometers (nm). The preferred fillers are the silica fillers, including fumed silica and precipitated silica. Those two forms of silica have surface areas in the ranges of 90–325 and 8–150 $m^2/g$, respectively.

The reinforcing filler is most often pretreated with a treating agent to render it hydrophobic. Typical treating agents include cyclic silicones such as cyclooctamethyltetrasiloxane and acyclic and cyclic organosilazanes such as hexamethyldisilazane, 1,3-divinyl-1,1,3,3-tetramethyldisilazane, hexamethylcyclotrisilazane, octamethylcyclotetrasilazane, and mixtures thereof. Hexamethyldisilazane is often preferred.

Non-reinforcing fillers include titanium dioxide, lithopone, zinc oxide, zirconium silicate, iron oxides, diatomaceous earth, calcium carbonate, glass fibers or spheres, magnesium oxide, chromic oxide, zirconium oxide, aluminum oxide, crushed quartz, calcined clay, talc, kaolin, asbestos, carbon, graphite, cork, cotton and synthetic fibers.

The proportions of the constituents of the silicone component may be varied widely. The amount of filler is generally about 5–200 parts and preferably about 10–150 parts by weight per 100 parts of reactive silicone. Catalysts and crosslinkers are generally present in the amounts of about 0.001–2.5% and about 0.25–5.0% by weight respectively, based on the combination of reactive silicone and filler.

Restorative compounds which may be used in connection with the present invention include oils such as polyorganosiloxanes (e.g., polyalkylsiloxanes, organic-compatible siloxanes, polymethylphenylsiloxanes, polydiphenylsiloxanes, hydrophilic siloxanes, carbinolfunctional siloxanes, and related compounds); crude oil products (e.g., paraffin wax, petroleum waxes, petrolatum, liquid paraffin, and greases); and fats, oils and waxes.

Oil-depleted biofouling release coatings may be restored by applying the restorative compound to the release coating surface. Such application may be by soaking, dipping, spraying, wiping, brushing, coating or otherwise exposing the coating surface to the desired restorative compound. During the application process, it is desirable to maintain the restorative compound in contact with the coating for a period of time sufficient to ensure adequate uptake of the restorative compound by the coating. The optimum period will vary according to a number of factors, including the identity and condition of the coating, the identity of the restorative compound, etc. The best contact time period for a given set of conditions may be readily determined by one of ordinary skill. A preferred period is at least about 10 hours, more preferably from about 10 to about 90 hours, and most preferably from about 24 to about 72 hours. Sufficient volumes of restorative compound to completely cover or immerse the surface of the coating are desirable, but not necessary. After treatment, the surface may be wiped dry, if desired. Any excess restorative compound may be recovered from the wipe for reuse by means known in the art.

The restorative compound useful in the present invention may be sold in the form of a kit, i.e., in a suitable container (e.g., a drum, can, carton, etc.), optionally with instructions for use being present in the kit, for example attached to or in association with the container. The kit may also comprise a container having a biofouling release coating, preferably compatible with the restorative compound.

The invention will be illustrated by the following non-limiting Examples.

EXAMPLES

1. PREPARATION OF BIOFOULING RELEASE COATING

An aluminum platen (4 in.×12 in.) was primed by wiping the surface with the commercially available primer SS4155 (GE Silicones). A coating was then prepared from 100 grams (g) of a silicone RTV composition (approx. 71% polydimethylsiloxane [viscosity, 310 centipoise], 29% calcium carbonate, and 2% ethyl silicate), catalyzed with 0.5 g dibutyltin dilaurate, and applied to the platen to a dry film thickness of 15 mils using a draw down blade. The coating was allowed to cure at room temperature for 7 days.

2. PREPARATION OF EXTRACTED (AGED) BIOFOULING RELEASE COATING

A biofouling release coating prepared as in Example 1 was extracted seven times in 200 milliliters (ml) toluene over a period of 3 days and dried.

3. PREPARATION OF REGENERATED BIOFOULING RELEASE COATING

An extracted biofouling release coating prepared as in Example 2 was soaked in a bath of approximately 300 ml polydimethyldiphenylsiloxane oil (number average molecular weight [Mn] about 2000) for 3 days, and then wiped dry.

4. PREPARATION OF ADDITIVE-ENHANCED BIOFOULING RELEASE COATING

An aluminum platen primed as in Example 1 was coated with a biofouling release coating prepared from 100 g of a silicone RTV composition (described in example 1), 10 g polydimethyldiphenylsiloxane oil (Mn about 2000), and 0.5 g dibutyltin dilaurate, to a dry film thickness of 15 mils using a draw down blade. The coating was allowed to cure at room temperature for 7 days.

5. PREPARATION OF EXTRACTED (AGED) ADDITIVE-ENHANCED BIOFOULING RELEASE COATING

A biofouling release coating prepared as in Example 4 was extracted in toluene as described in Example 2.

6. REGENERATION OF ADDITIVE-ENHANCED BIOFOULING RELEASE COATING

An extracted biofouling release coating was prepared as in Example 5, then soaked in a bath of approximately 300 ml polydimethyidiphenylsiloxane oil (Mn about 2000) for 3 days, and wiped dry.

7. DETERMINATION OF BIOFOULING RELEASE PROPERTIES

Samples prepared according to each of the examples 1–6 were placed in the Indian River in Florida in cages until barnacle settlement occurred. The barnacle attachment strength was measured on two identically prepared panels for each surface coating, according to the barnacle adhesion test method as described below. Results are shown in Table 1. The data indicate that the enhanced biofouling release properties of an oil-depleted sample is restored by exposure to a new additive source.

Biofouling release properties were quantitated by a standard barnacle adhesion test. This test measures the force required to remove barnacles from a surface and provides data that can be used to compare the ability of surfaces to reduce biofouling (barnacle) adhesion under field conditions as described in Example 7. This test was approved as an ASTM standard in 1994 (ASTM D5618, 1994).

Live barnacles selected for testing were between 5 and 20 millimeters (mm) diameter at the base adhering to the surface to be tested. Their species and condition were noted. Barnacles were preferably at least 20 mm from the edge of the test substrate panel, attached to undamaged areas of the test surface, and not in direct contact with other barnacles. The barnacle base was measured with calipers in four directions (0, 45, 90, 135 degrees) to obtain an average base diameter, taking care not to dislodge the barnacle. The barnacle base plate area, A, was then estimated using the average base diameter, $d_a$, according to the formula $$A=(\pi d_a^2)/4.$$

A shear force was then applied to the barnacle base, parallel to the testing surface using a hand-held Shimpo mechanical dial force gauge (range=0–89 N (0–20 lb); accuracy=±0.3%; resolution=0.45N (0.1 lb)) at a rate of approximately 4.15N $s^{-1}$ (1.0 lb $s^{-1}$) until the barnacle became detached or the maximum shear force was reached. The force (F) required for detachment was noted. If more than 10% of the barnacle base plate was left attached to the substrate, the test was deemed void since incomplete removal of the barnacle base plate from the surface during testing may lead to erroneous adhesion values. The strength of adhesion, τ, was then calculated according to the formula $$\tau=F/A.$$

Whenever possible, a minimum of ten measurements were made per coating.

TABLE 1

Barnacle Adhesion Values

| Example | Barnacle Adhesion (psi) |
|---|---|
| Ex. 1: release coating manufactured without incorporation of additives | panel 1 13.95 +/− 4.27<br>panel 2 14.07 +/− 4.01 |
| Ex. 2: release coating manufactured without incorporation of additives (extracted) | panel 1 12.63 +/− 3.36<br>panel 2 16.38 +/− 5.10 |
| Ex. 3: release coating manufactured without incorporation of additives (restored) | panel 1 5.43 +/− 2.24<br>panel 2 7.75 +/− 6.19 |
| Ex. 4: release coating manufactured with incorporation of additives | panel 1 8.29 +/− 2.16<br>panel 2 0.29 +/− 0.24 |
| Ex. 5: release coating manufactured with incorporation of additives (extracted) | panel 1 14.96 +/− 3.79<br>panel 2 15.39 +/− 3.68 |
| Ex. 6: release coating manufactured with incorporation of additives (restored) | panel 1 10.81 +/− 4.21<br>panel 2 9.91 +/− 3.88 |

The tests provide data for surfaces that have been coated with a biofouling release coating manufactured with or without an additive to increase the release properties of the coating (examples 1 and 4), and those same coated surfaces after an oil depletion treatment (examples 2 and 5), and after subsequent restoration with the inventive method (examples 3 and 6).

The data confirm that experimental oil-depletion of biofouling release coatings manufactured with oil reduces the effectiveness of the release coating (compare examples 4 and 5), as does the oil-depletion known to occur with aging. Coatings lacking the additive were unaffected by the simulated aging, as expected (compare examples 1 and 2).

Use of the inventive method for restoring enhanced biofouling release properties to such a coating decreases the amount of force needed to remove the barnacles, evidencing a restoration of the enhanced release properties (compare examples 5 and 6). The inventive method also improves the biofouling release properties of coatings not originally manufactured with oils (compare examples 1 and 2 with example 3). The results in Table 1 demonstrate clearly that intact silicone biofouling release coatings are capable of capturing or recapturing additives applied to their surfaces, and acquiring or reacquiring the enhanced biofouling release properties those additives impart.

What is claimed is:

1. A method of introducing enhanced biofouling release properties to an intact, oil-depleted biofouling release coating, which method comprises exposing the surface of the biofouling release coating to a restorative compound for a time sufficient to effect enhancement of biofouling release properties, wherein the restorative compound is selected from the group consisting of silicone oil, a hydrocarbon oil, a grease, a wax, and combinations thereof.

2. The method of claim 1, wherein the biofouling release coating comprises a silicone-based polymer.

3. The method of claim 2, wherein the polymer comprises a polydialkylsiloxane.

4. The method of claim 3, wherein the polydialkylsiloxane has the formula:

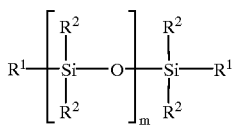

(I)

wherein each $R^1$ is a hydroxyl radical or

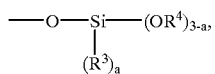

(II)

each $R^2$ is independently a hydrocarbon or fluorinated hydrocarbon radical, each $R^3$ and $R^4$ is a hydrocarbon radical, a is 0 or 1, and m has a value such that the viscosity of said compound under ambient temperature and pressure conditions is up to about 50,000 centipoise.

5. A method according to claim 1, wherein the restorative compound is a silicone oil.

6. A method according to claim 5, wherein the silicone oil is a polymethylphenylsiloxane oil.

7. A method according to claim 1, wherein the time of exposure is at least about 10 hours.

8. A method according to claim 7, wherein the time of exposure is from about 10 to about 90 hours.

9. A method according to claim 8, wherein the time of exposure is from about 24 to about 72 hours.

10. A method according to claim 1, wherein the biofouling release coating was manufactured without enhancing additives.

11. A method according to claim 1, wherein the biofouling release coating was manufactured with enhancing additives.

* * * * *